Sept. 25, 1951 W. A. ENDTER 2,569,046
FLOATING BOLT LATCH MECHANISMS
Filed Oct. 30, 1947 6 Sheets-Sheet 1
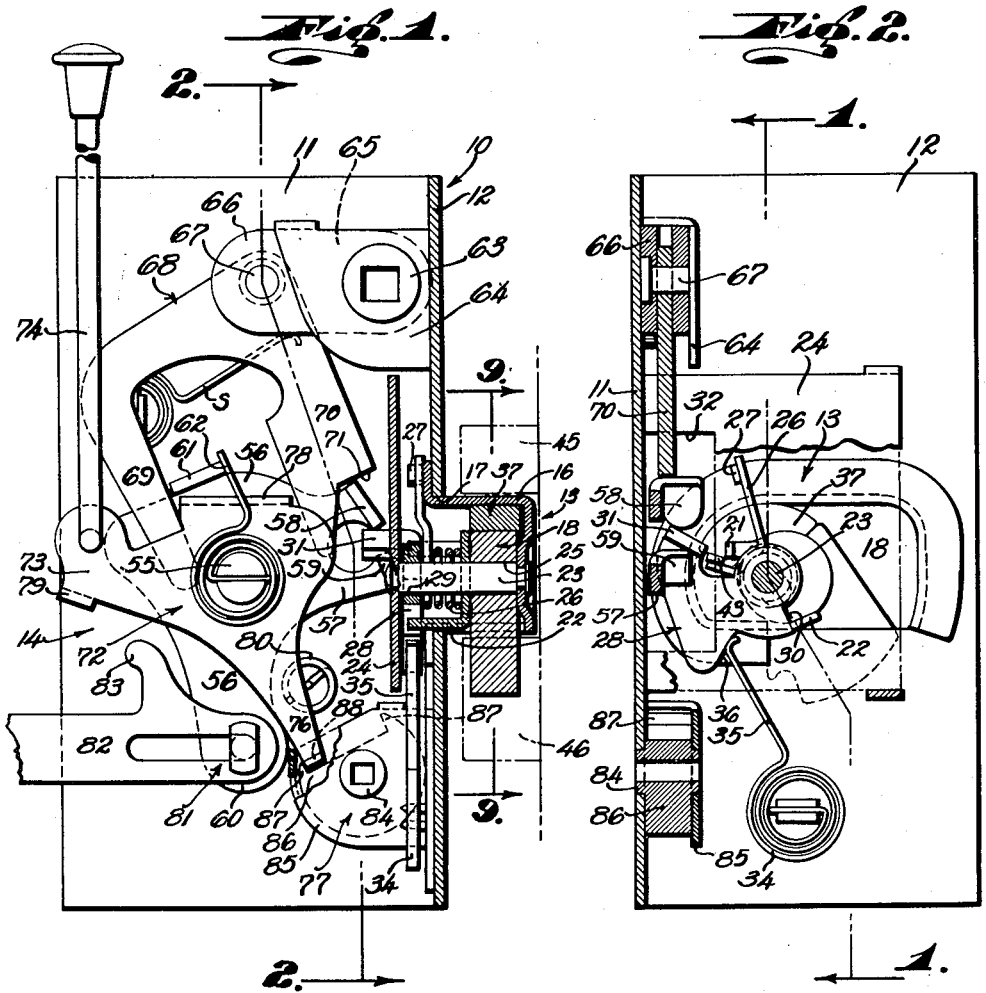
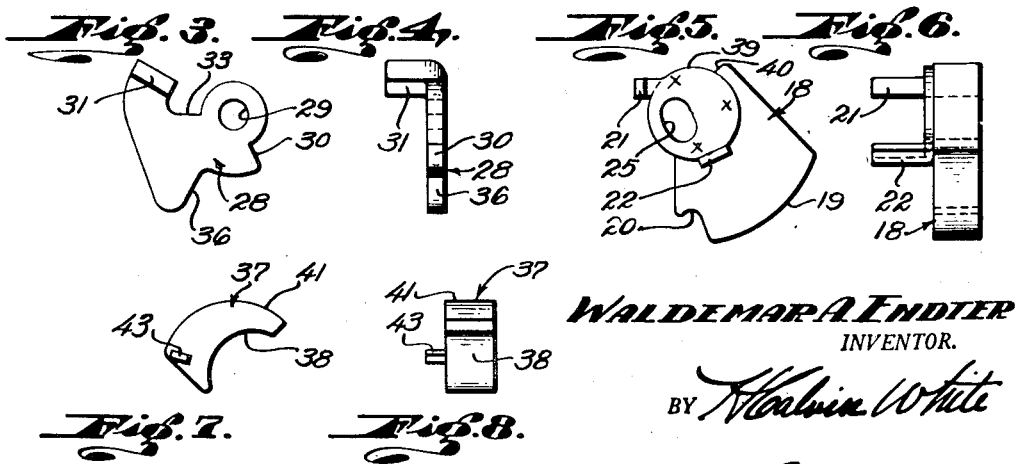
WALDEMAR A. ENDTER
INVENTOR.
BY
ATTORNEY Sept. 25, 1951 W. A. ENDTER 2,569,046
FLOATING BOLT LATCH MECHANISMS
Filed Oct. 30, 1947 6 Sheets-Sheet 2
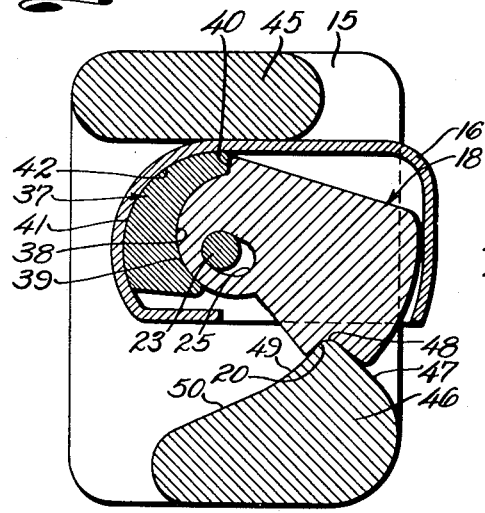
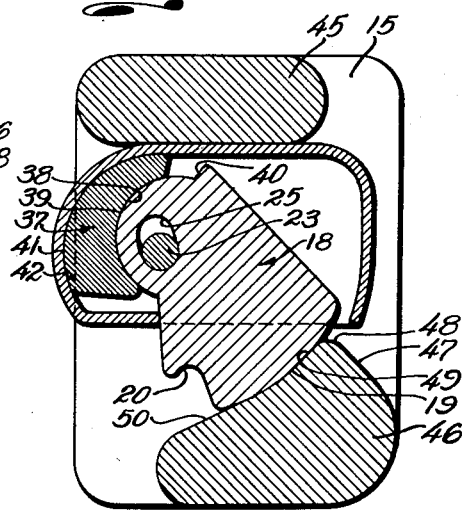
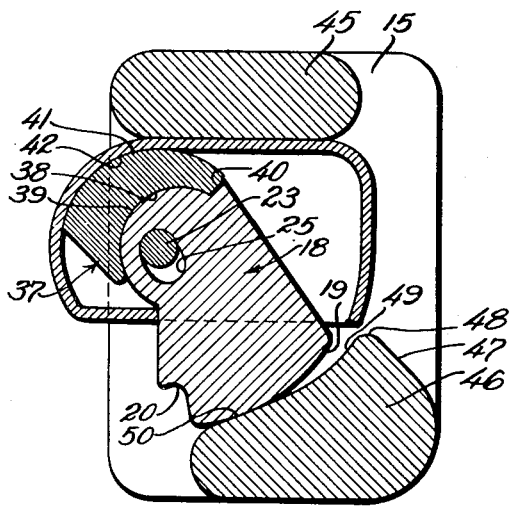
WALDEMAR A. ENDTER
INVENTOR.
BY H. Calvin White
ATTORNEY Sept. 25, 1951 W. A. ENDTER 2,569,046
FLOATING BOLT LATCH MECHANISMS
Filed Oct. 30, 1947 6 Sheets-Sheet 3
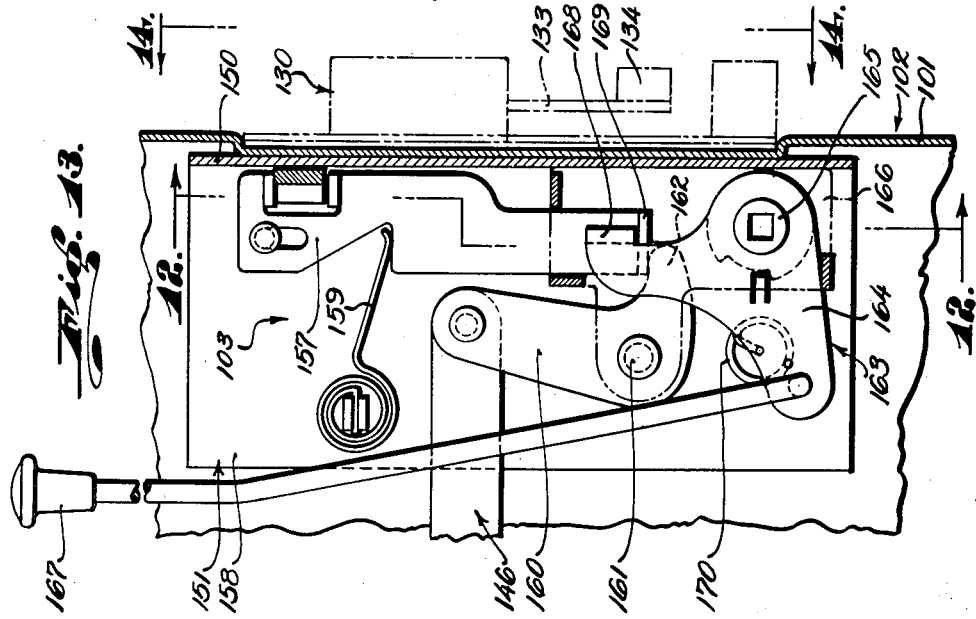
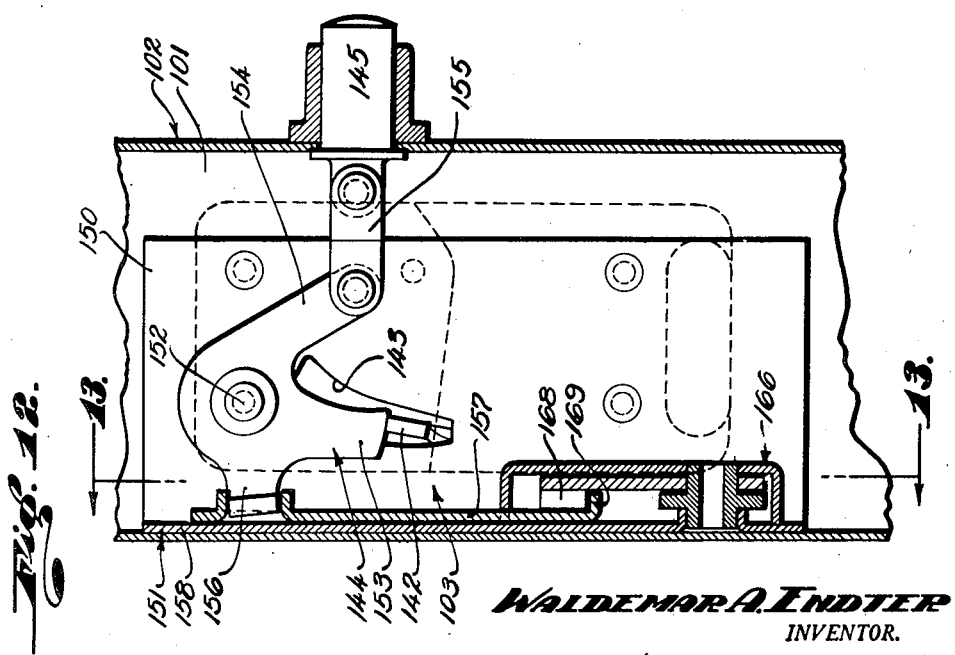
WALDEMAR A. ENDTER
INVENTOR.
BY
ATTORNEY

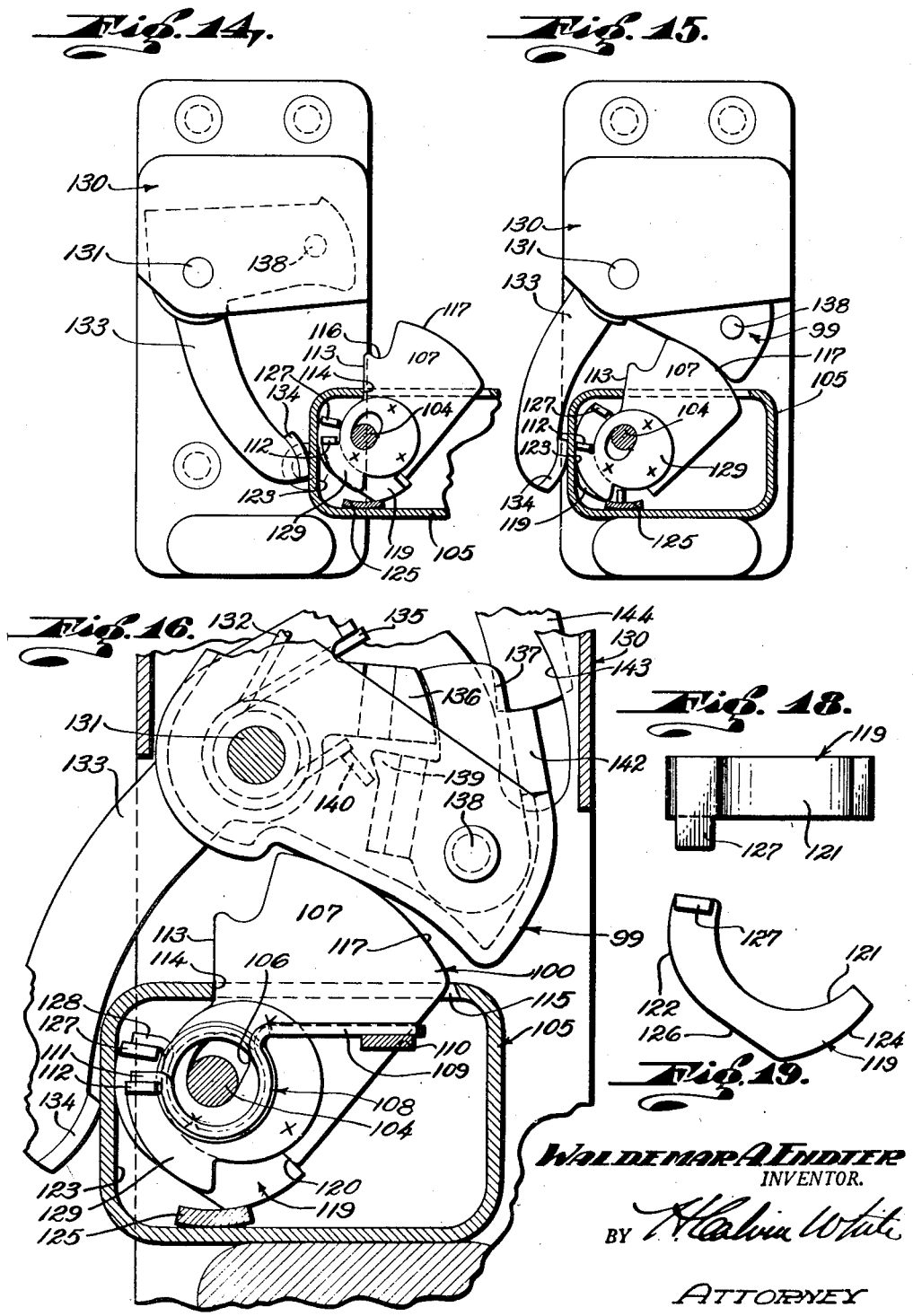

Sept. 25, 1951 W. A. ENDTER 2,569,046
FLOATING BOLT LATCH MECHANISMS
Filed Oct. 30, 1947 6 Sheets-Sheet 5
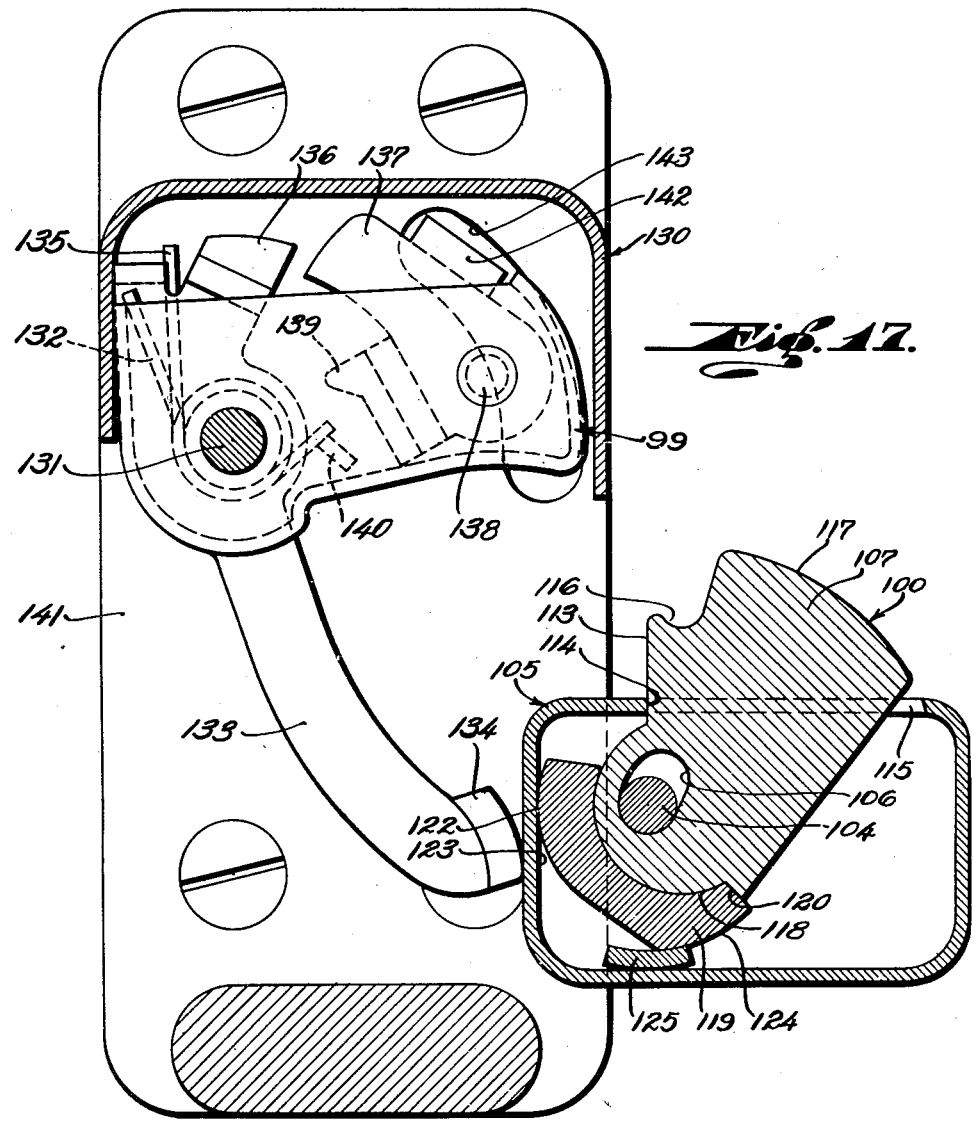
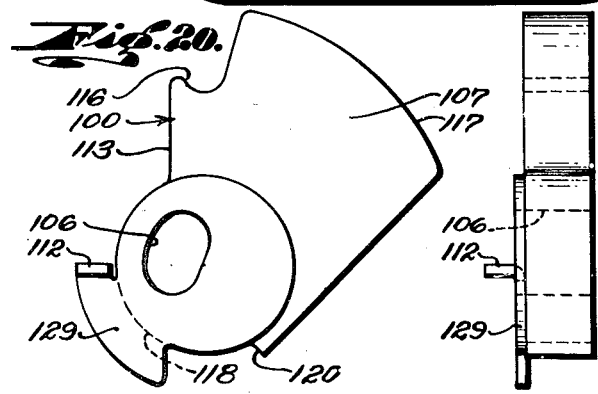
WALDEMAR A. ENDTER
INVENTOR.
BY
ATTORNEY Sept. 25, 1951 W. A. ENDTER 2,569,046
FLOATING BOLT LATCH MECHANISMS
Filed Oct. 30, 1947 6 Sheets-Sheet 6
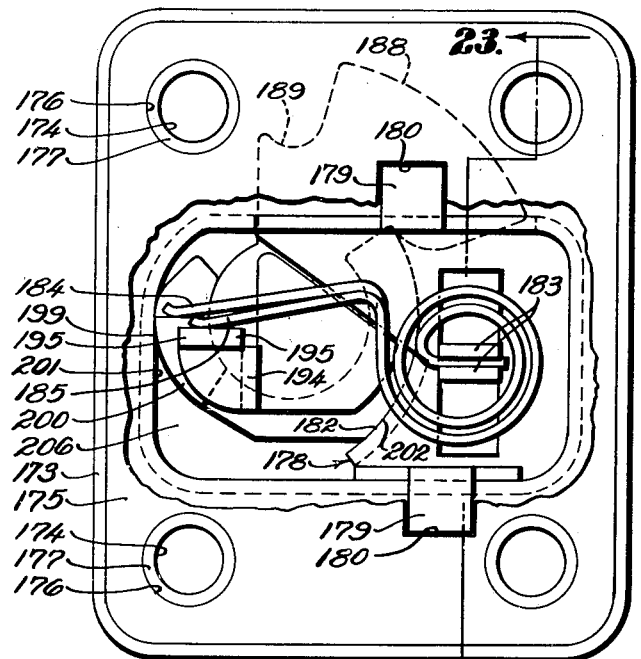
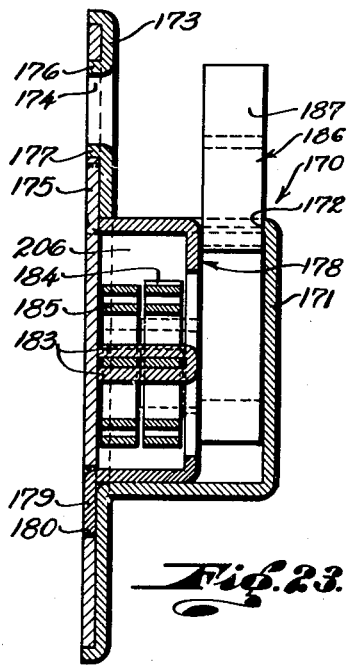
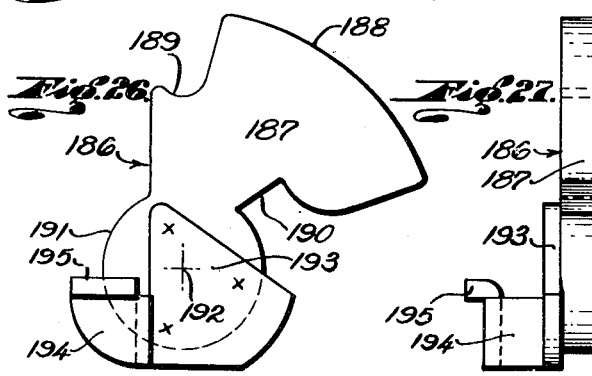
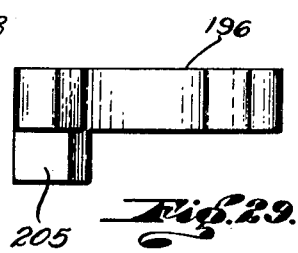
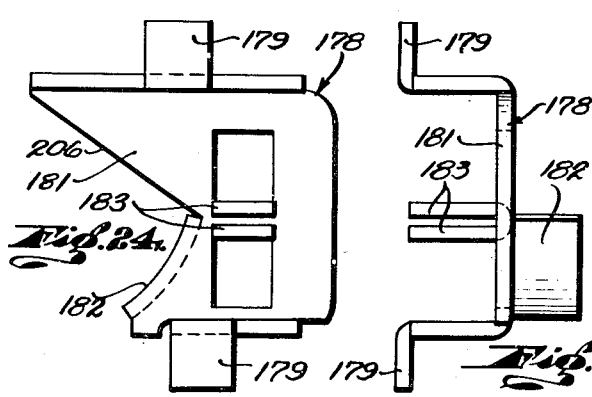
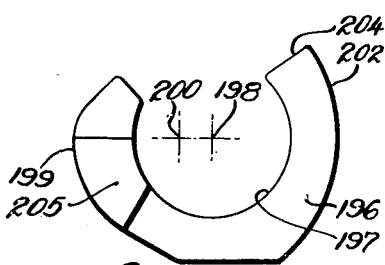
WALDEMAR A. ENDTER
INVENTOR.
BY
ATTORNEY

Patented Sept. 25, 1951

2,569,046

UNITED STATES PATENT OFFICE 2,569,046

FLOATING BOLT LATCH MECHANISM

Waldemar A. Endter, Long Beach, Calif.

Application October 30, 1947, Serial No. 783,184

14 Claims. (Cl. 292—223)

This invention relates to improvements in latching mechanisms applicable particularly, though typically, to the latching of vehicle doors or other closures to effect a secure, take-up type closed association of the closure with the body to which it is applied. Particularly the invention has to do with improvements in the structure and operating characteristics of latch mechanisms comprising a "floating" swinging bolt capable of rotation to effect latched association with a keeper, and of bodily movement relative to the bolt carrying member, i. e. door or pillar as the case may be, to permit exertion of a constant take-up door closing thrust. This general type of bolt action is contemplated in the mechanisms disclosed in my patent and copending applications identified as follows: Patent No. 2,376,992, issued May 29, 1945, on "Latch Devices"; application Ser. No. 597,097, filed June 1, 1945, on "Latching Mechanism"; application Ser. No. 672,582, filed May 27, 1946, on "Floating Bolt Latch."

The invention is more directly concerned with the particular type of latch mechanism in which the bolt is mounted, as indicated, for bodily movement, and is directly engageable against a part serving to transmit the bolt thrust and to hold the bolt against unintentional release from latched condition. Certain of my prior applications referred to above show the bolt to be engaged against a stationary member or abutment so that in latched position the bolt functions as a rigid thrust transmitting element, and the abutment holds or blocks the bolt against retrograde movement.

One of my major objects now is to adapt the bolt engaged member or abutment to serve not only as a means for preventing release of the bolt, but also to create the take-up action characteristic of all these floating bolt mechanisms. Accordingly, the invention provides for engagement of the bolt against a movable abutment in the nature of a cam, the latter being urged in a direction tending to bodily thrust the bolt in a take-up direction.

Specifically contemplated is a form of springurged cam interposed between the bolt and a stationary portion of the bolt case or housing, the cam and bolt having engaged correspondingly arcuate surfaces of such extent that the radial keeper-imposed thrust against the bolt in all of its latched positions is transmitted to such engaged surfaces so that no reactive force or component tends to release the bolt. Thus, once engaged in the keeper, the bolt is assured of retaining that engagement. By giving the cam eccentric surface engagement with the stationary member engaging portion of the housing, constant spring thrust against the cam urges the bolt in a take-up direction while maintaining the described interengaged relation of the bolt and cam.

As will appear, the invention contemplates association of the described bolt actuating parts with any suitable type and form of control mechanisms, whether for example of the more conventional kind utilizing a stationary keeper on the door pillar, or the type actuated by a push button or other form of operator and functioning when released, to spring the door open.

All the various features and objects of the invention, as well as the details of certain illustrative embodiments, will be explained to better advantage in the following detailed description of the accompanying drawings, in which:

Fig. 1 is a view taken in section on line 1—1 of Fig. 2 in the axial plane of the bolt shaft and illustrating in elevation the control mechanism inside the angular case;

Fig. 2 is a section on line 2—2 of Fig. 1;

Figs. 3 and 4 are side and edge views, respectively, of the bolt actuating arm;

Figs. 5 and 6 are side and edge views, respectively, of the bolt;

Figs. 7 and 8 are side and edge views, respectively, of the cam;

Fig. 9 is an enlarged section on line 9—9 of Fig. 1 showing the bolt in safety catch engagement with the keeper;

Figs. 10 and 11 are similar views showing the bolt in progressive stages of latching advancement;

Fig. 12 is a vertical section taken on line 12—12 of Fig. 13, illustrating a variational form of the invention;

Fig. 13 is a section on line 13—13 of Fig. 12;

Figs. 14 and 15 are views taken from line 14—14 of Figs. 13 showing progressive positions of the keeper parts with relation to the bolt assembly, the bolt housing appearing in section;

Fig. 16 is a fragmentary enlarged view showing the parts advanced beyond the positions of Fig. 15;

Fig. 17 is an enlarged view further detailing the parts positioned as in Fig. 14;

Figs. 18 and 19 are edge and side views, respectively, of the cam embodied in the mechanism of Figs. 12 to 17;

Figs. 20 and 21 are side and edge views, respectively, of the bolt;

Fig. 22 is a view taken at the inside of the bolt housing, illustrating a variational form of the invention with respect to the bolt and cam assembly and directly associated parts;

Fig. 23 is a section on line 23—23 of Fig. 22;

Figs. 24 and 25 are side and edge views, respectively, of the insert or saddle piece;

Figs. 26 and 27 are side and edge views, respectively, of the bolt; and

Figs. 28 and 29 are side and edge views, respectively, of the cam.

Referring first to the embodiment of Figs. 1 to 11, the latch mechanism may be contained in the usual angular case 10 having right angle flanges 11 and 12 carrying respectively the bolt and cam assembly 13 and the handle, push button and lock controlled mechanisms generally indicated at 14. As will be understood, the case 10 is adapted to be applied in the usual manner to one of two relatively movable members, e. g. a door, to be maintained in latched relation with the second member, e. g. the usual pillar, to which is applied the keeper plate 15, see Figs. 9 to 11. The case flange 12 carries the open bottom bolt housing or bracket 16, the latter extending through the case opening 17 as illustrated in Fig. 1.

As particularly illustrated in Figs. 5 and 6, the bolt 18 has a curved keeper engaging face 19 terminating at the safety catch recess 20, the bolt carrying a pair of lugs 21 and 22 projecting inwardly through the case opening 17. The bolt is loosely carried on a shaft 23 terminally supported by the housing 16 and the stationary deck plate 24 inside the case. The shaft passes through the arcuately extending opening 25 in the bolt so that the latter is capable of both free swinging and bodily movements under the influence of its keeper engagement, all as will later appear. By "bodily movement" or "bodily displacement" of the bolt is meant displacement of all parts of the bolt out of the paths of rotation which those parts would take if the bolt movement were confined to rotation about a fixed axis.

At the inside of the spring 26, the shaft carries a pivoted bolt actuating arm 28, see Figs. 3 and 4, having a shaft passing opening 29, a shoulder 30 and a turned lug 31 projecting through an opening 32 in the deck 24, see Fig. 2. Shoulder 30 is engageable against the bolt lug 22 to produce anti-latching rotation of the bolt in response to actuation of the arm 28 in the manner later explained. Surface 33 on the arm is engaged by the bolt lug 21 so that though separately formed, the bolt 18 and arm 28 are interengaged for swinging movement together. Movement of the arm and bolt in an anti-latching direction is resisted by a coil spring 34, the free end 35 of which bears against the arm surface 36.

A bodily latching thrust is imparted to the bolt by a cam 37, see Figs. 7 and 8, interposed between the bolt and its housing 16, the cam having an arcuate or segmental circular face 38 engaged against the correspondingly curved surface 39 of the bolt. Rotation of the cam relative to the bolt in an advancing direction is limited by engagement of the end of the cam with the bolt shoulder 40. The cam has a circularly curved outer face 41, eccentric with relation to the curvature center of its inner face 38, bearing against the correspondingly curved inner surface 42 of the housing. Thus as the cam is swung or rotated through the positions of Figs. 9 to 11, the bolt 18 is bodily and correspondingly thrust outwardly of the housing. The cam is constantly urged in a bolt advancing direction by coil spring 26 carried about the shaft 23 and bearing against the cam lug 43 and the stationary case lug 27. It will be observed that by reason of the circular curvature of the engaged cam and bolt surfaces 38 and 39, all direct lines of reactive force transmitted from the keeper to the bolt will intersect the circular curvature of these surfaces, and hence there can be no reactive force or component tending to release the bolt from any of its latched positions in the keeper.

The plate 15 carries vertically spaced projections in the form of a horizontal surface lug 45 and keeper 46 and an inclined surface 47 leading to the rounded top portion 48, an inclined surface beyond this surface, having at 49 a curvature conforming to the bolt surface 19, and a continuing substantially straight cam surface 50.

In considering at this point the operation of the described parts, assume the bolt assembly 13 to move toward the left to an initial position, see Fig. 9, bringing the housing 16 and bolt between the lug 45 and keeper 46, at which the keeper nose 48 enters the bolt recess 20 to establish the safety catch position of the parts. Upon initial engagement of the bolt surface 51 with the keeper surface 47, the bolt of course is cammed upwardly to clear the keeper until the position is reached at which spring 34 snaps the bolt down to safety catch position. During this initial upward displacement of the bolt, the cam 37 is carried with the bolt against the resistance of spring 26.

As the door is further closed, the bolt overrides the keeper nose 48 and is thrust by the action of spring 34 into a position bringing the bolt and keeper surfaces 19 and 49 into the relation shown in Fig. 10, the bolt during the time being movable in advance of the cam. The thrust of spring 26 against the cam then produces the take-up action created by rotation of the cam as to the Fig. 11 position, with resultant movement of the bolt along the keeper surface 50 and crowding of the closure to fully closed position as permitted by the take-up capacity of the door cushion. The bolt thus is securely maintained in its advanced latched position.

The control mechanism 14 is to be regarded merely as illustrative of suitable devices for effecting the bolt release by inside or outside operators or door handles, and for locking the bolt by means controllable from the inside and outside of the door. The particular assembly 14 constitutes the subject matter of my application Ser. No. 640,860, filed January 12, 1946, on "Lock Control Mechanism."

The case flange 11 carries a pin 55 on which is pivoted a bolt actuated bell crank lever 56 having a bifurcated arm 57 carrying spaced lugs 58 and 59 between which is received lug 31 on the bolt control arm 28, so that in effect the lever and bolt are interconnected for movement together in opposite directions. Lever 56 has a second arm 60 for connection with the later described operator, the lever carrying also a lug 61 engaged by coil spring 62 on the pin 55, the spring serving to take up any looseness between the parts and to resist anti-latching rotation of the lever. Spindle 63 journaled in the bracket 64 carries at its outer end the usual outside operator (not shown), and carries inside the case an arm 65 rotatable with the spindle. The free bifurcated end 66 of the arm is pivotally connected by pin 67 with the bifurcated yoke element 68, the arms 69 and 70 of which are projectible downwardly and at opposite sides of the pin 55. The arm 70 has a shoulder 71 normally engageable against lug 58 so that upon opening turning of the outside operator against the resistance of spring S engaging the arm 65, the lever 56 is rotated to produce anti-latching rotation of the bolt. As will appear, the element 68 is rotatable on pin 67 independently of the arm 65 to disengage or dissociate the arm 70 from lug 48, thus permitting independent movement of the outside operator and directly associated parts.

Pin 55 carries along side lever 56 the control lever 72 which has an arm 73 pivotally connected to the usual push button rod 74 operable at the inside of the door, and a second arm 76 adapted to be engaged and actuated by a key controlled locking device generally indicated at 77. Lever 72 has an upper lug 78 engageable against arm 69 of the element 68, and carries a second lug 79 on the bottom of the arm portion 73. The control lever normally assumes the position shown in Fig. 1. Upon depression of the push button rod 74, the lever is rotated counterclockwise to shift shoulder 71 out of engagement with lug 58. Initial movements of the control lever in either direction are resisted by an "over center" coil spring 80 connected to the arm 76 and the case flange 11.

Arm 56 of the actuating lever has at 81 a pin and slot connection with link 82 attached to the usual inside operator or door handle, the link being reciprocable in response to turning movements of the handle. The lost motion connection 81 permits rotation of the lever 56 independently of the link 82 as the bolt rotates upon entering the keeper, and provides a positive connection for retraction of the bolt from the keeper. Link 82 carries a hook 83 engageable with lug 79 when the push button is in down position, to lock the link against bolt retractive movement.

The key controlled lock 77 may include the usual key receiving tumbler assembly (not shown) which controls rotation of the spindle 84 extending through the housing bracket 85 and carrying the rotor 86. By virtue of the engageability of its projections 87 with the control lever lug 88, the rotor functions in essentially the same manner as the push button rod 74.

To open the door from the outside, spindle 63 is turned to displace element 68 downwardly, causing arm 70 to engage and rotate part 28 to release the bolt from the keeper. To release the bolt and open the door from the inside, movement to the left of link 82 turns lever 56 to rotate the bolt out of the keeper. As previously indicated, the door may be locked at the inside by pressing down the push button rod 74 to bring the control lever lug 69 beneath hook 83 and thus prevent retraction of the link 82, lug 78 simultaneously being engaged against arm 69 to swing element 68 to a position at which shoulder 71 is operatively dissociated from the lug 58. Additional operating characteristics of the control mechanism 14 are explained in application Ser. No. 640,860.

Figs. 12 to 21, inclusive, illustrate the invention embodied in a push button control lock of the type described in my copending application Ser. No. 705,843, filed October 26, 1946, on "Latching Mechanisms for Closures," wherein the bolt 100 is carried by the relatively stationary pillar and the keeper 99 is carried by the free edge 101 of the door 102 to be retractible and under the control of the lock mechanism 103.

The retractible bolt 100 is similar to the above described bolt 18 and oscillates on a pin 104 for retraction within its housing 105. The bolt, see Figs. 20 and 21, is provided with an arcuate slot 106 for receiving the pin 104 to permit pivotal movement accompanied by radial movement for the purpose to be later described, and is normally urged by a spring 108 to the position illustrated in Figs. 14 to 17, inclusive, where its active end 107 projects from the housing 105. The torsion spring 108 surrounds the pin 104 and has one of its ends 109 engaging a lug 110 of the housing 105 and its other end 111 engaging the lug 112 on plate 129 spot welded to the side of the bolt. The bolt has a radial surface 113 normally engaging the end wall 114 of the bolt-receiving opening 115 in the housing 105.

The arcuate bolt surface 117 cooperates with the keeper 99 when the door is in its closed or latched condition, and has a second arcuate surface 118 concentric with and of a smaller radius than surface 117, diametrically opposite the latter, for engaging a cam 119. The arcuate slot 106 is concentric with the two surfaces 117, 118 and extends substantially parallel with the line drawn diametrically through the surfaces 117, 118 to permit shifting of the bolt substantially radially along said line. Surface 118 extends from the surface 113 to the stop shoulder 120 approximately 180 degrees therefrom.

The cam 119 has an arcuate surface 121 engaging surface 118 of the bolt, and a surface 122 engaging the wall 123 of the housing. Surface 122 is eccentric relative to the surface 121 and is concentric with the pin 104 when the bolt is in the extended position illustrated in Figs. 14, 16 and 17. A second cam surface 124, concentric with the surface 122, engages an arcuate shoe 125 carried by the housing 105. The surface 124 may have a larger radial curvature than the surface 122 and terminates at a flat face 126 between the surfaces. The cam carries a lug 127 engageable by one end of a torsional spring 128 surrounding the pin 104. The other end of the spring engages the lug 110 of the housing 105 to urge the cam in the same direction as the spring-urged bolt 100.

The retractible keeper carried by the free edge 101 of the door 102, is contained within a housing 130 for pivotal movement on a shaft 131 and is normally urged toward its retracted position illustrated in Figs. 14 and 17, by a spring 132. A setting arm 133 pivoted on the shaft 131, depends from the housing 130 and carries a shoe 134 for engaging the stationary bolt housing. Arm 133 is normally urged in the forward direction by a spring 135. The arm is provided with a projection 136 for engaging a pivoted pawl 137 carried on the outer end of the retractible keeper by a pin 138. With the parts in the position illustrated in Fig. 17, the setting arm 133 extends downwardly and forwardly to engage the housing 105 as the door is closed. Engagement of the setting arm shoe 134 with the housing causes rearward swinging of the arm accompanied by forward swinging of its upper extension 136 into engagement with the pawl 137 to project keeper 99 from the housing 130.

Projection of the keeper 99 from the housing 130 continues until lug 139 on the pawl 137 engages a stationary stop 140 formed in plate 141 carrying the housing 130 and the setting arm 133. At this point the locking lug 142 extending through registering slots 143 in the plate 141 in the outer face 101 of the door, is in position to be engaged and locked by a control element 144 of the lock mechanism 103. The keeper is held in this blocking position by the element 144 until such time as the element is shifted either by the outside push button 145 or the inside operator 146.

During initial closing of the door, the keeper is projected from the housing 130 to a position receiving the notch 116 of the bolt to hold the door in the safety catch position. Further closing movement of the door causes retraction of the bolt, permitting it to be received behind the keeper, as illustrated in Fig. 15.

During retraction of the bolt 100, shoulder 120 thereon engages the end of the cam 119 to rotate the cam therewith about pin 104. Upon reaching the position of Fig. 15, with the cam in the retracted position and the bolt behind the keeper 99, spring 100 urges the bolt behind the keeper and any thrust in an anti-closing direction is taken directly on the cam. Further movement in a closing direction caused by looseness in the door or its resilient cushions allows the cam urged by its spring 128 to take up this play. Fig. 16 illustrates the cam in its full take-up position where the cam has rotated relative to the bolt and has projected the bolt to its fullest extent through the opening 115 of the housing 105.

The control element 144 is pivotally carried on a pin 152 by the forward side 150 of the L-shaped case 151. The element 144 is provided with an arm 153 cooperating with the lug 142 of the pawl 137, as described above, and a second arm 154 operatively connected with the push button 145 through a linkage 155. A third arm 156 on the element 144 cooperates with a reciprocating plate 157 carried by the other side 158 of the case 151. Spring 159 urges the plate 157 downwardly and at the same time holds the arm 153 in engagement with the lug 142.

The inside operator 146, shown in the form of a reciprocating rod, is connected with one arm 160 of a bell crank pivoted at 161 to the side 158 of the case, the other arm 162 of the bell crank engaging the lower end of the reciprocating plate 157 to transmit movement from the inside operator 146 to the control element 144.

The control 163 for the lock mechanism 103 includes a bell crank 164 pivotally carried at 165 in a housing 166 at the inside of the plate 158, and is operated either by a key from the outside of the door or by the control button 167 located at the inside. The bell crank 164 has a hook 168 for engaging an in-turned lug 169 on the lower end of the reciprocating plate 157 to prevent reciprocation of the plate or movement of the control element 44. The control 163 is held in its locked or unlocked position by an overthrow spring 170. Figs. 12 and 13 illustrate the control in its locked position.

Figs. 22 to 29 illustrate a further variational form of the invention having particularly to do with the bolt and cam assembly, and specifically operable as and for the purposes of the bolt-cam and their housing assembly previously described with reference to Figs. 14 to 21.

Referring particularly to Figs. 22 to 25, the body, generally indicated at 170, comprises the hollow housing portion 171 having at its top the bolt-passing opening 172, and a plate or flange portion 173 containing openings 174 for reception of screws by means of which the assembly is fastened to its supporting pillar. A plate 175 contained within the flange 173 flush with the inner surface thereof, contains openings 176 for reception of the upset portions 177 of the flange defining the screw passing openings 174.

The housing 171 contains a generally U-shaped insert 178, see Figs. 24 and 25, carrying a pair of lugs 179 receivable within correspondingly shaped openings 180, see Fig. 22, in the plate 175 and corresponding in thickness therewith, so that the insert 178 is in effect clamped in position by the association of the flange 173 and plate 175. The insert has an angular edge 181 terminating at an outwardly projecting arcuate abutment 182, the curvature of which corresponds to the curvature of the later described cam face engaging the abutment. The insert also carries a pair of spaced lugs 183 between which is secured a cam-actuating spring 184, and the bolt-actuating spring 185.

Referring now to Figs. 26 and 27, the bolt 186 consists of a single piece assembly comprising a body 187 having an arcuate keeper-engaging surface 188, a safety catch recess 189, and a second recess terminating at the cam-engaging shoulder 190. The central edge portion 191 of the bolt has true circular curvature with its center at 192. The arm plate 193, spot welded to the bolt, has an extension 194 carrying the lug 195 engageable by spring 185, see Fig. 22.

In Figs. 28 and 29, the cam 196 is shown to consist of a single piece element having a circular opening 197, of greater than 180 degree angularity about its center 198, and corresponding with the bolt curvature at 191 so that with that portion of the bolt received within the cam opening in the assembled relation of the parts, bolt and cam are relatively rotatable along their engaged circular surfaces. At one side the cam has a circularly curved surface 199 with its center at 200, engageable at 201 against the inside of the housing 171, see Fig. 22, and at its opposite side a second curved surface 202 engageable against and corresponding in curvature with the insert shoulder 182, see Fig. 24. The cam has an end face or shoulder 204 engageable by the bolt shoulder 190. Lug 205 carried by the cam, is engaged by spring 184 to urge the cam in a bolt advancing direction.

With the parts assembled as shown in Figs. 22 and 23, the cam 196 and its contained bolt 186 are positioned between, and with just sufficient clearance to assure free rotation of the bolt, the outer face of the housing 171 and the insert 178. By reason of the notched configuration 181 of the insert, the bolt and cam lugs 195 and 205 are permitted to project into space 206 inside the insert 178, for engagement by the springs.

Normally the parts may be assumed to have the position illustrated by Fig. 22, in which the cam is thrust by spring 184 to project the bolt to its advanced position out of the housing, by reason of the eccentricities of the cam faces 199 and 202 relative to the center 198. The limit of the spring-urged position of the cam relative to the bolt, is established by the engagement of the cam end 204 with the bolt shoulder 190. Antilatching rotation of the bolt within the cam is of course resisted by spring 185.

Upon its engagement with the keeper, the bolt and cam assembly are rotated against the resistance of the springs, distances corresponding to the bolt displacement by the keeper. Thereafter, the bolt is rotatable in a latching direction under the influence of spring 185 and relative to the cam, and spring 84 then becomes effective to rotate the cam relative to the bolt, and to bodily thrust the bolt against the keeper.

The last described form of the invention is characterized in a number of distinctive respects. It will be observed that the described parts constitute a unitary assembly which can be applied to and removed from the supporting structure or pillar for replacement or repair, without having to disturb any of the associated mechanisms carried by the door. Also it will be noted that the bolt is in a strict sense carried by the cam, in that while rotatable relative thereto, the arcuate extent of the cam opening 197 is such as to confine the bolt against bodily movement out of the cam. A further feature is the balanced assumption of the bolt thrust by the cam, in a manner tending to prevent inadvertent or accidental release of the cam when the bolt is in latched position. The general line of thrust transmitted from the keeper through the bolt is through the center 198, and with the cam engaged at opposite sides of the center at the cam surfaces 199 and 202, the cam will maintain its position until freed for movement by disengagement of the bolt from its keeper.

I claim:

1. A latch mechanism comprising a body plate and a housing projecting from said plate and containing an opening, a bolt mounted in said housing for swinging movement parallel to said plate and projecting through said opening to engage a keeper, a shaft extending through an opening in the bolt of larger size than the shaft to permit bodily movement of the bolt relative to the shaft, a cam interposed between and engaging the bolt and housing and movable about the axis of the shaft to bodily displace the bolt, a spring urging said cam in a bolt latching direction, a spring resisting anti-latching rotation of the bolt, a movable operator at the inside of said plate, and means carried by said shaft and actuated by said operator to sequentially move said cam in a direction releasing the bolt from the keeper and rotate the bolt in an antilatching direction.

2. A latch mechanism comprising a body plate and a housing projecting from said plate and containing an opening, a bolt mounted in said housing for swinging movement parallel to said plate and projecting through said opening to engage a relatively stationary keeper, a shaft extending through an opening in the bolt of larger size than the shaft so that the bolt is both rotatably and bodily movable in relation to the shaft, a cam interposed radially between the bolt and housing and bodily movable about the axis of said shaft in an arcuate path of travel to bodily displace the bolt relative to the shaft, means mounting the cam for bodily movement in an arcuate path about the bolt, and a spring acting to move the cam relative to the bolt and thrust the bolt against the keeper, whereby said housing is moved relatively away from the keeper.

3. In a latch mechanism for a stationary member and a swinging closure member, the combination comprising: a bolt adapted to be mounted for rotation and radial bodily displacement on one of the members, said bolt having a peripheral surface portion for rotative latching engagement with a keeper mounted on the other of the members and a convex arcuate surface portion, peripherally spaced from and substantially diametrically opposite said keeper-engaging surface portion; means adapted to be fixedly mounted on the one member and defining an abutment surface extending about said bolt in opposition to said arcuate bolt surface portion; and cam means interposed between and engaging said abutment surface and said arcuate bolt surface portion for movement in a curved path about said bolt, the engaged surfaces of said bolt and said cam means being complementary and said cam means being effective upon movement in the direction of latching rotation of said bolt to bodily displace the latter in keeper-engaging direction in order to exert opposed thrusts against the one member and said bolt to hold the latter against the keeper and move the closure member toward the stationary member.

4. The structure defined in claim 3 including retaining means adapted to be fixedly mounted on the one member and engageable by the bolt for limiting the extent of radial bodily displacement thereof in keeper-engaging direction.

5. The structure defined in claim 3 in which the bolt mounting includes a pivot pin adapted to be fixedly mounted on the one member and extending through an elongated opening in the bolt.

6. The structure defined in claim 3 in which engaged surfaces of the bolt and the cam means extend through an arc greater than 180°.

7. The structure defined in claim 3 including resilient means urging the bolt and the cam means for movement in latching directions.

8. The structure defined in claim 3 including a spring engaged with the one member and the bolt and urging the latter for latching rotation and a second spring engaged with the one member and the cam means and urging the latter for movement to bodily displace said bolt in keeper-engaging direction.

9. The structure defined in claim 3 including means defining substantially radially disposed engageable surfaces on said bolt and said cam means for moving the latter by anti-latching rotation of said bolt.

10. In a latch mechanism for a stationary member and a swinging closure member, the combination comprising: a pivot pin adapted to be mounted on one of the members; a bolt having an elongated bearing opening receiving said pin to mount said bolt for rotation and radial bodily displacement thereon, said bolt having a peripheral surface portion for rotative latching engagement with a keeper mounted on the other of the members and a convex arcuate surface portion peripherally spaced from and substantially opposite said keeper-engaging surface portion; means adapted to be fixedly mounted on the one member and defining an abutment surface extending about said pin in opposition to said arcuate bolt surface portion; and cam means interposed between and engaging said abutment surface and said arcuate bolt surface portion for movement in a curved path about said bolt, the engaged surfaces of said bolt and said cam means being complementary and said cam means being effective upon movement in the direction of latching rotation of said bolt to bodily displace the latter relative to the one member in keeper-engaging direction.

11. The structure defined in claim 10 including spring means urging the cam and the bolt for movement in the direction of latching rotation of the latter and engageable means on said bolt and said cam for moving the latter with the bolt upon anti-latching rotation thereof.

12. In a latch mechanism for a stationary member and a swinging closure member, the combination comprising: a somewhat crescent-shaped cam means adapted to be mounted for rotation on one of the members and having outer convex arcuate peripheral surface portions and an inner convex arcuate surface portion eccentric with respect to the center of curvature of said peripheral surface portions, said inner surface portion extending through an arc greater than 180°; a bolt having a peripheral surface portion for rotative latching engagement with a keeper mounted on the other of the members and a convex arcuate surface portion, peripherally spaced from said keeper-engaging surface portion and mating with said inner cam means surface portion, whereby said bolt is carried by said cam means for limited rotation thereon; and means adapted to be fixedly mounted on the one member and defining an abutment surface extending about said cam means in opposition to the peripheral surface portions thereof and for rotation of said cam means thereagainst, said cam means being effective upon movement in the direction of latching rotation of said bolt to bodily displace the latter, relative to the one member, in keeper-engaging direction.

13. The structure defined in claim 12 including retaining means adapted to be fixedly mounted on the one member and engageable by the bolt for limiting the extent of bodily displacement thereof in keeper-engaging direction.

14. The structure defined in claim 12 including resilient means urging the cam means and the bolt for rotation in the direction of latching rotation of the latter.

WALDEMAR A. ENDTER.

REFERENCES CITED

The following references are of record in the file of this patent:

UNITED STATES PATENTS

| Number | Name | Date |
|---|---|---|
| 699,696 | Mellen | May 13, 1902 |
| 1,026,489 | Blake | May 14, 1912 |
| 1,252,454 | Le Beau | Jan. 8, 1918 |
| 1,279,353 | Kelly et al. | Sept. 17, 1918 |
| 1,395,708 | Grode | Nov. 1, 1921 |
| 1,439,260 | Pruell | Dec. 19, 1922 |
| 1,569,120 | Glover | Jan. 12, 1926 |
| 1,642,266 | Raw | Sept. 13, 1927 |
| 1,711,213 | Smith | Apr. 30, 1929 |
| 2,003,731 | Beito | June 4, 1935 |
| 2,246,786 | Dall | June 24, 1941 |
| 2,376,992 | Endter | May 29, 1945 |

FOREIGN PATENTS

| Number | Country | Date |
|---|---|---|
| 493,768 | Great Britain | Oct. 10, 1938 |
| 810,192 | France | Mar. 17, 1937 |